(12) United States Patent
Noh et al.

(10) Patent No.: US 6,242,130 B1
(45) Date of Patent: Jun. 5, 2001

(54) CASE CONTAINING SECONDARY BATTERY

(75) Inventors: Hyung-gon Noh, Seoul; Jong-hoon Yun, Pusan, both of (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/328,795

(22) Filed: Jun. 9, 1999

(30) Foreign Application Priority Data

Jul. 29, 1998 (KR) .................................................. 98-30677

(51) Int. Cl.⁷ .............................. H01M 2/02; H01M 2/04
(52) U.S. Cl. .......................... 429/175; 429/176; 429/178
(58) Field of Search .................................. 429/175, 176, 429/163, 178; H01M 2/02, 2/04

(56) References Cited

U.S. PATENT DOCUMENTS

| | | | |
|---|---|---|---|
| 347,258 | * | 8/1886 | Starr . |
| 410,054 | * | 8/1889 | Waldron . |
| 2,100,333 | * | 11/1937 | Hess . |
| 3,146,132 | * | 8/1964 | Nathan . |
| 3,772,139 | * | 11/1973 | George . |
| 5,510,207 | * | 4/1996 | Grivel et al. . |

\* cited by examiner

Primary Examiner—John S. Maples
(74) Attorney, Agent, or Firm—Leydig, Voit & Mayer, Ltd.

(57) ABSTRACT

A case for a secondary battery includes a pan having a space for accommodating a battery main body and an opening. A first bonding portion extends along the edge of the pan. A second bonding portion extends along the edge of the cover portion for corresponding attachment to the first bonding portion when folded onto the pan. Thus, mass production of the case is possible and the bonding portion becomes firm when the first and second bonding portions are bonded together.

9 Claims, 6 Drawing Sheets

CASE CONTAINING SECONDARY BATTERY

BACKGROUND OF THE INVENTION

1. Field of the Invention

The present invention relates to a case for a secondary battery and a manufacturing method thereof, and more particularly, to a case for a secondary battery which seals a main body of a current-generating battery, and to a manufacturing method thereof.

2. Description of the Related Art

Secondary batteries usually include a battery main body for generating current formed by stacking an anode plate, a cathode plate and a separator. An electrode terminal is connected to the battery main body which functions as an electrical passage to the outside. The battery main body and a portion of the electrode terminal are coupled, forming a seal.

According to the conventional technology, a lithium secondary battery is manufactured after the battery main body is inserted in a case in the form of a pouch. However, due to the structure as above, mass production of the battery is not easy and furthermore a bonding surface which closes a receiving portion of the case where the battery is received is not stable.

SUMMARY OF THE INVENTION

To solve the above problems, it is an objective of the present invention to provide a case for a secondary battery which can be manufactured through mass production and has an improved bonding surface.

It is another objective of the present invention to provide a method for manufacturing the case for a secondary battery Accordingly, to achieve the first objective, there is provided a case for a secondary battery which comprises: a pan having a space for accommodating a battery main body and an opening at the upper side thereof; a first bonding portion extended along the edge of the pan; a cover portion extended from the upper portion of one side of the pan for closing the opening of the pan by being folded onto the pan; and a second bonding portion extended along the edge of the cover portion and correspondingly attached to the first bonding portion when folded onto the pan.

It is preferable in the present invention that the pan, the first bonding portion, the cover portion, and the second bonding portion are integrally formed.

It is also preferable in the present invention that the first bonding portion and the second bonding portion are attached to each other without deformation.

It is yet preferable in the present invention that an emboss is formed at corresponding portions of the first bonding portion and the second bonding portion and the embossed portions of the first bonding portion and the second bonding portion are attached to each other.

It is further preferable in the present invention that concave and convex portions are formed at corresponding portions of the first bonding portion and the second bonding portion along the edge thereof and the concave and convex portions of the first bonding portion and the second bonding portion are attached to each other.

According to another aspect of the present invention, there is provided a case for a secondary battery which comprises: a pan having a space for accommodating a battery main body and an opening at the upper side thereof; a first bonding portion extended along the edge of the pan; a cover portion formed separately from the pan for closing the opening of the pan; and a second bonding portion extended along the edge of the cover portion and correspondingly attached to the first bonding portion.

To achieve the second objective, there is provided a method for manufacturing a case for a secondary battery which comprises the steps of: sectioning a plate material for the case to form a pan and a cover portion on the plate material; molding the material to form the pan; and severing the material according to each section of the plate material preparing a case material in a plate state: setting a plurality of sections on the case material for forming a pan of a battery main body, a gas receiving portion disposed at a side surface of the pan of the battery main body, a path connecting between the pan of the battery main body and the gas receiving portion, and a cover portion covering the pan of the battery main body and the gas receiving portion together; forming the pan of the battery main body, the gas receiving portion, and the path by molding the case material; and severing the case material according to each section.

It is preferable in the present invention that the molding of the material is performed by a pressing process.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
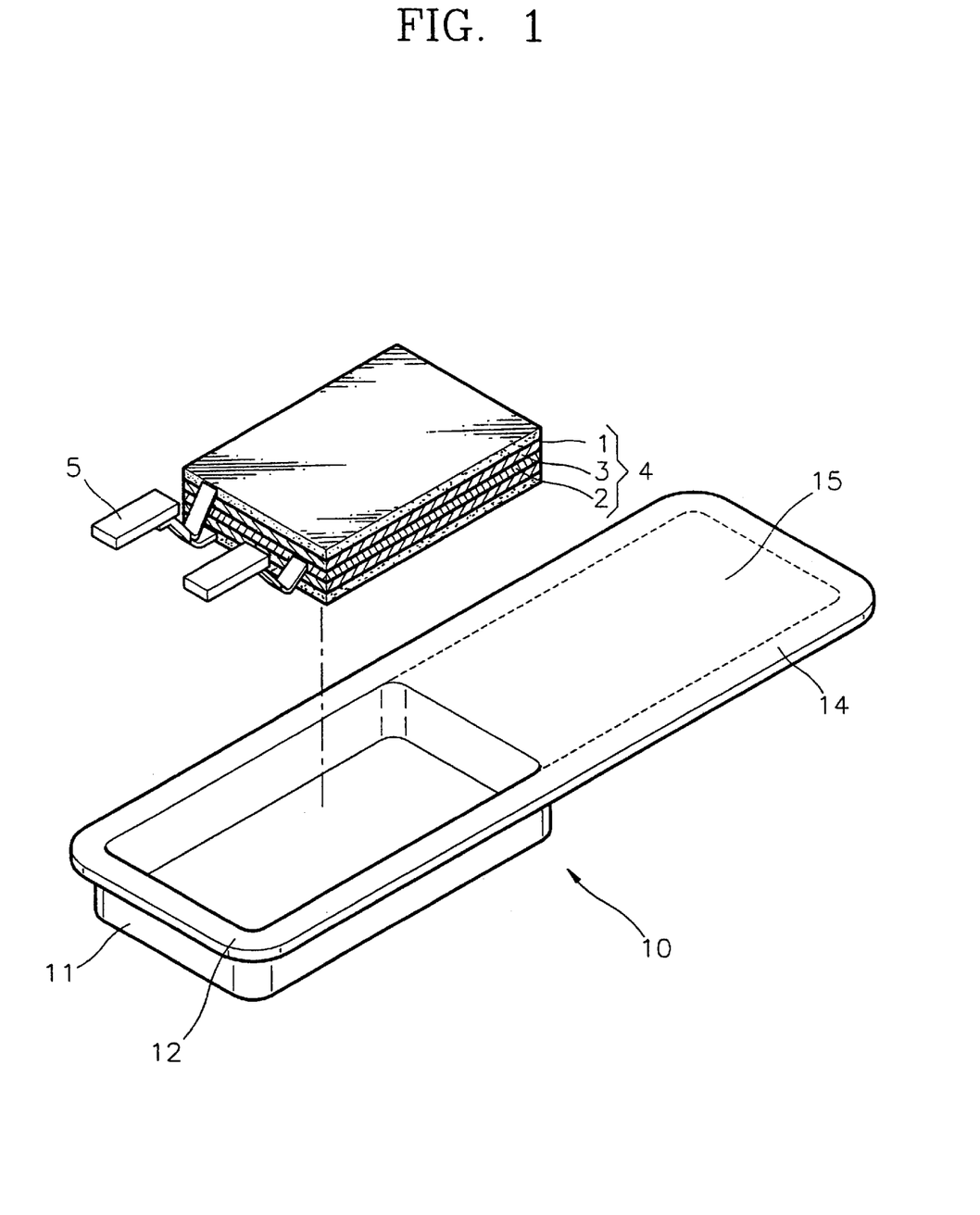
FIG. 1 is an exploded perspective view illustrating a secondary battery having a case according to a preferred embodiment of the present invention.

FIG. 1 shows a case of a secondary battery according to a preferred embodiment of the present invention. Referring to the drawing, the secondary battery includes a battery main body 4 for generating current, in which an anode plate 1, a cathode plate 2 and a separator 3 are stacked, and a case 10 for housing the battery main body 4. The battery main body 4 can have a different structure according to the type of lithium secondary battery, for example, a lithium ion battery, a lithium polymer battery, and a plastic lithium ion battery. One end of an electrode terminal 5 functioning as an electrical passage to the outside is connected to each electrode plate of the battery main body 4 when the battery main body 4 is coupled to the case 10 forming a seal. The other end of the electrode terminal 5 is exposed to the outside.

According to the present invention, the case 10 includes a pan 11 where the battery main body 4 is received, a first bonding portion 12 which is a flange along the edge of the pan 11, a cover portion 15 which is to be folded onto the pan 11 to close the opening of the pan 11, and a second bonding portion 14 which is extends along the edge of the cover portion 15 and attached to the first bonding portion 12 when the cover portion is folded onto the pan 11. The pan 11 is a cubic space for accommodating the battery main body 4 and has an opening only at the upper surface thereof. The cover portion 15 is an extended flange on one side of the pan 11 and can close the pan 11 when folded.

The pan 11, the first bonding portion 12, the cover portion 15, and the second bonding portion 14 are integrally formed. The battery main body 4 is inserted in the pan 11 through the opening. As shown in the drawing, the first bonding portion 12 and the second bonding portion 14 form one rectangular flange when the cover portion 15 is not folded onto and does not close the pan 11. The cover portion 15 closes the upper opening of the pan 11 after the battery main body 5 is inserted in the pan 11. The first bonding portion 12 and the second bonding portion 14 can be bent 90° after being bonded together.

Figure 2:
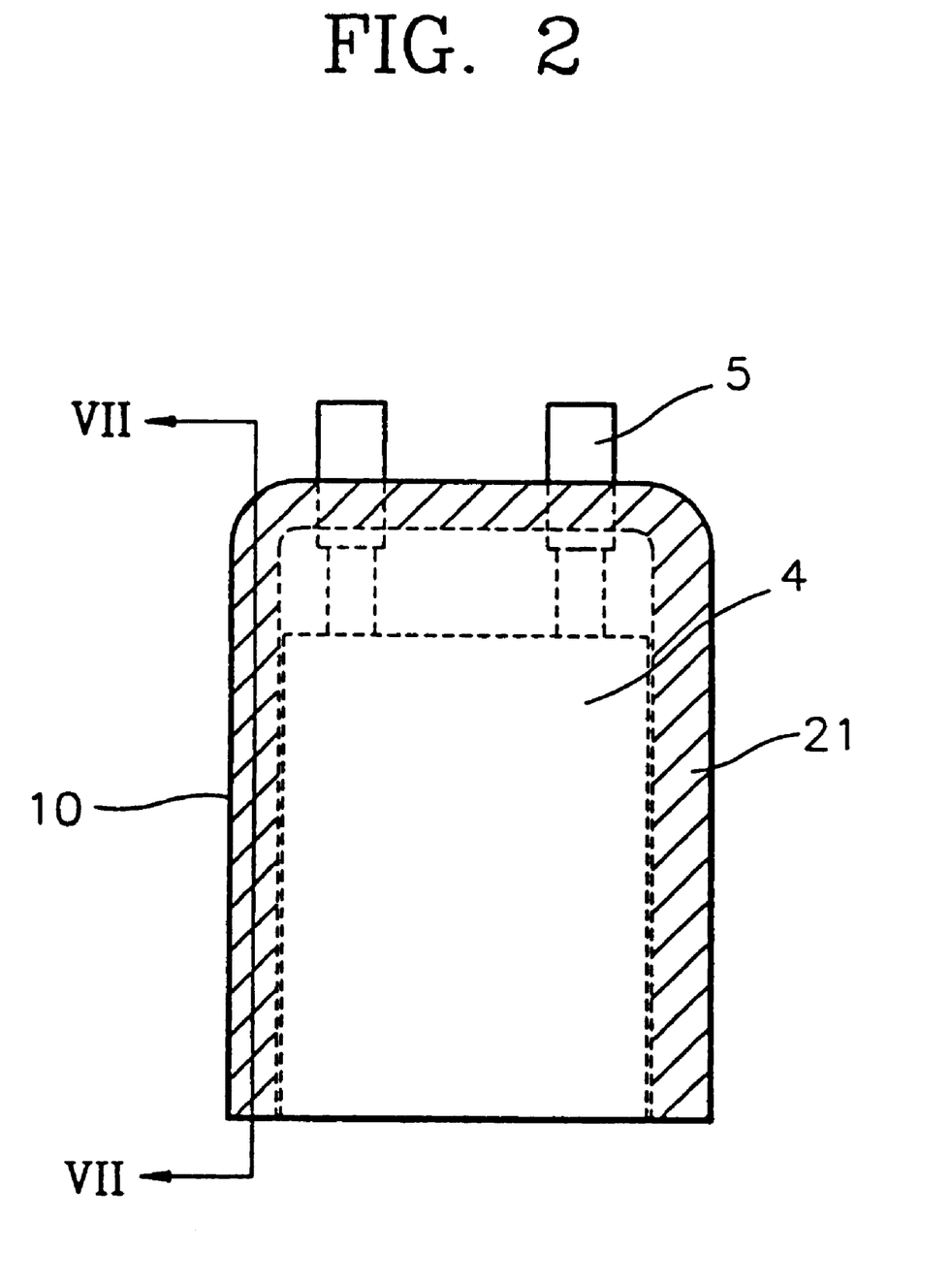
FIG. 2 is a plan view of the secondary battery of FIG. 1 in an assembled state.

FIG. 2 is a plan view showing the secondary battery of FIG. 1 in an assembled state. Referring to the drawing, after the battery main body 4 is inserted into the pan 11, the electrode terminal 5 connected to each electrode plate (not shown) of the battery main body 4 are exposed outside the case 10 to a predetermined length and the cover portion 15 closes the pan 11. The hatched area 21 in the drawing shows the area where the first and second bonding portions 12 and 14 are coupled to each other. Here, since no additional bonding portion is needed for the portion where the cover portion 15 extends from the pan 11, the ratio of occupancy of the battery main body 4 to the total volume of the case 10 increases. Thus, battery efficiency per unit volume is improved in the secondary battery.

Figure 3:
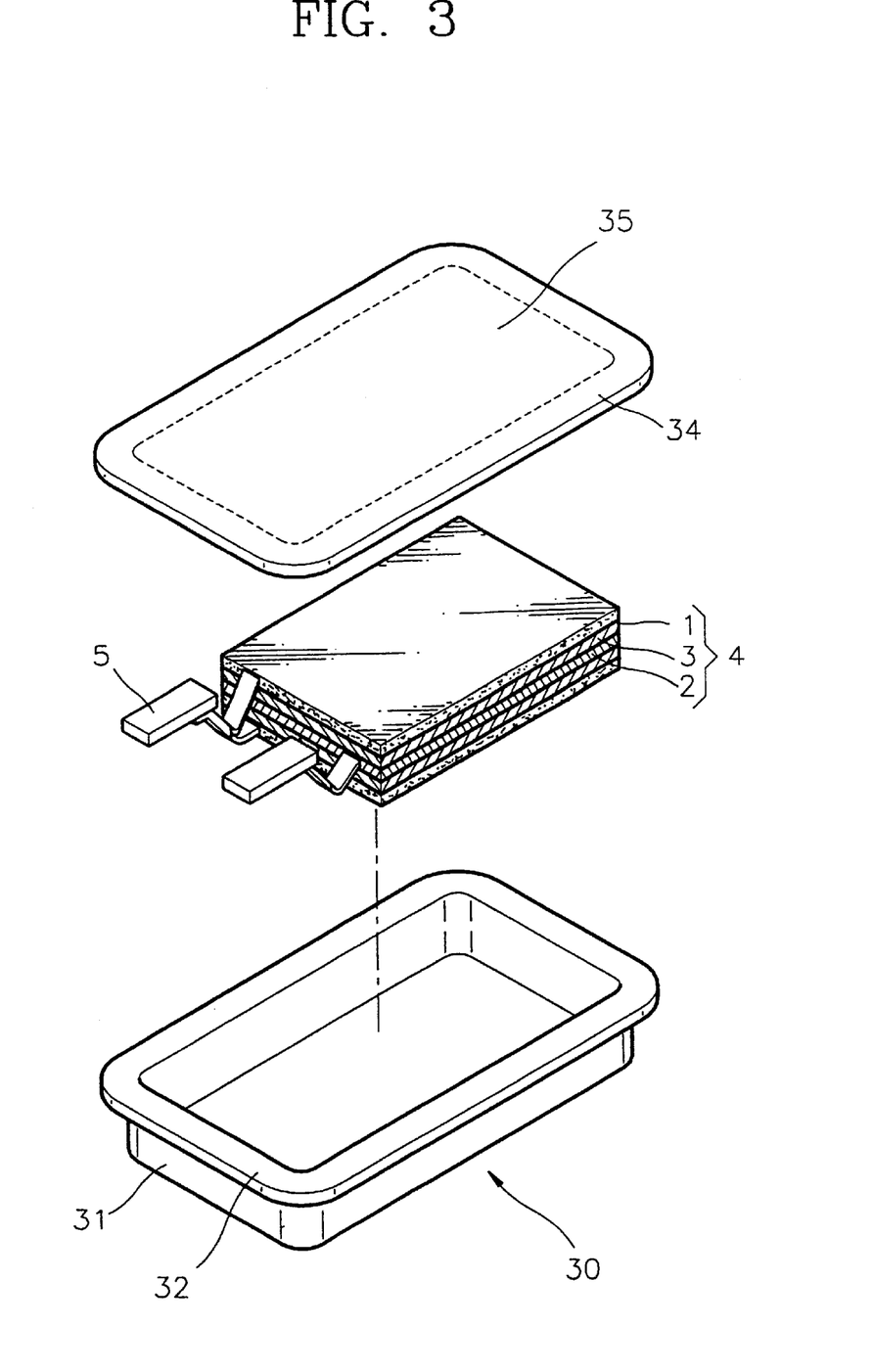
FIG. 3 is an exploded perspective view illustrating a secondary battery having a case according to another preferred embodiment of the present invention.

FIG. 3 shows a case for a secondary battery according to another preferred embodiment of the present invention. Referring to the drawing, the secondary battery, as in the secondary battery shown in FIG. 1, includes a battery main body 4 for generating current, in which an anode plate 1, a cathode plate 2 and a separator 3 are stacked, and a case 30 for sealing the battery main body 4. Here, the case 30 includes a pan 31 and a cover portion 35 separately manufactured to cover the opening of the pan 31. The pan 31 is rectangular. The pan 31 has a flange as a first bonding portion 32. The cover portion 35 is a plate capable of closing the opening of the pan 31 after the battery main body 4 is inserted into the pan 31. A second bonding portion 34 is a marginal area of the cover portion 35 and the second bonding portion 34 is attached to the first bonding portion 32. The pan 31 and the cover portion 35 can be manufactured by a molding process such as metal molding of plate material for the case.

Figure 4:
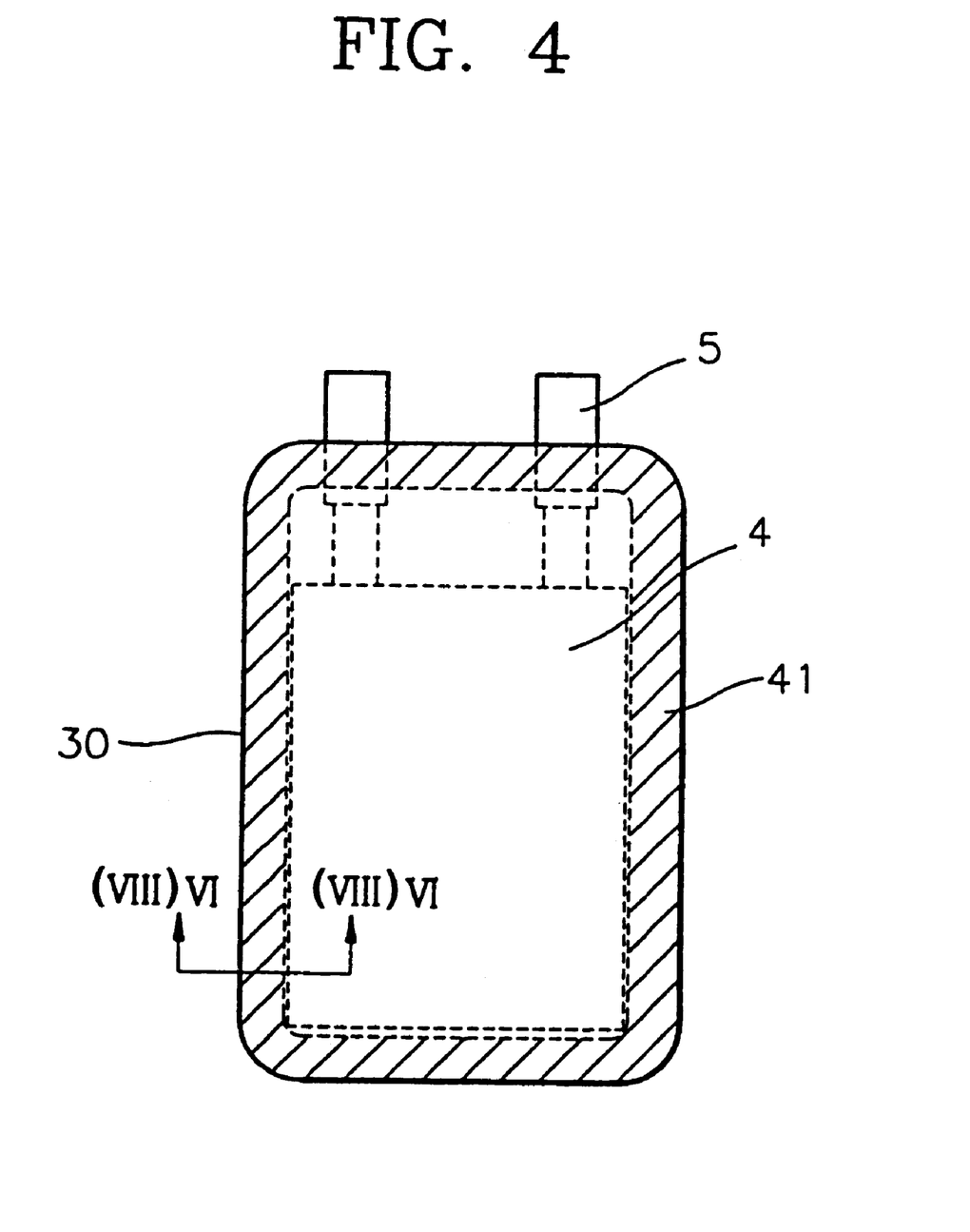
FIG. 4 is a plan view of the secondary battery of FIG. 3 in an assembled state.

FIG. 4 is a plan view showing the secondary battery of FIG. 3 in an assembled state. Referring to the drawing, the battery main body 4 is inserted into the pan 31 and the cover portion 35 covers the pan 31 in a state in which the electrode terminals 5 connected to the respective electrode plates (not shown) of the battery main body 4 are exposed outside the case 30 to a predetermined length. The hatched area 41 of the drawing indicates a portion where the first bonding portion 32 and the second bonding portion 34 are attached to each other. Here, to increase the bonding strength between the first bonding portion 32 and the second bonding portion 34, the pan 31 and the cover portion 35 can be manufactured using different materials and in different thicknesses.

The case for the secondary battery having the above structure may be manufactured as follows.

A metal plate is molded to form the pan 11 (31) and the first bonding portion 12 (32), and the second bonding portion 14 (34) at the cover portion 15 (35). Here, the cover portion 15 (35) and the second bonding portion 14 (34) are formed integrally with the pan 11 (31) and the first bonding portion 12 (32) or separately therefrom. The battery main body 4 is inserted into the pan 11 (31) and the electrode terminals 5 connected to the battery main body 4 are arranged to be exposed outward. The first bonding portion 12 (32), which is a flange of the pan 11 (31), and the second bonding portion 14 (34), which is a marginal area of the cover portion 15 (35), are attached to each other, forming a closed space inside the case 10 (30). The above manufacturing method is schematically described. In an actual case, a step for storing gas generated when the battery main body 4 is charged or discharged in the gas receiving portion, which will be described with reference to FIG. 5.

Figure 5:
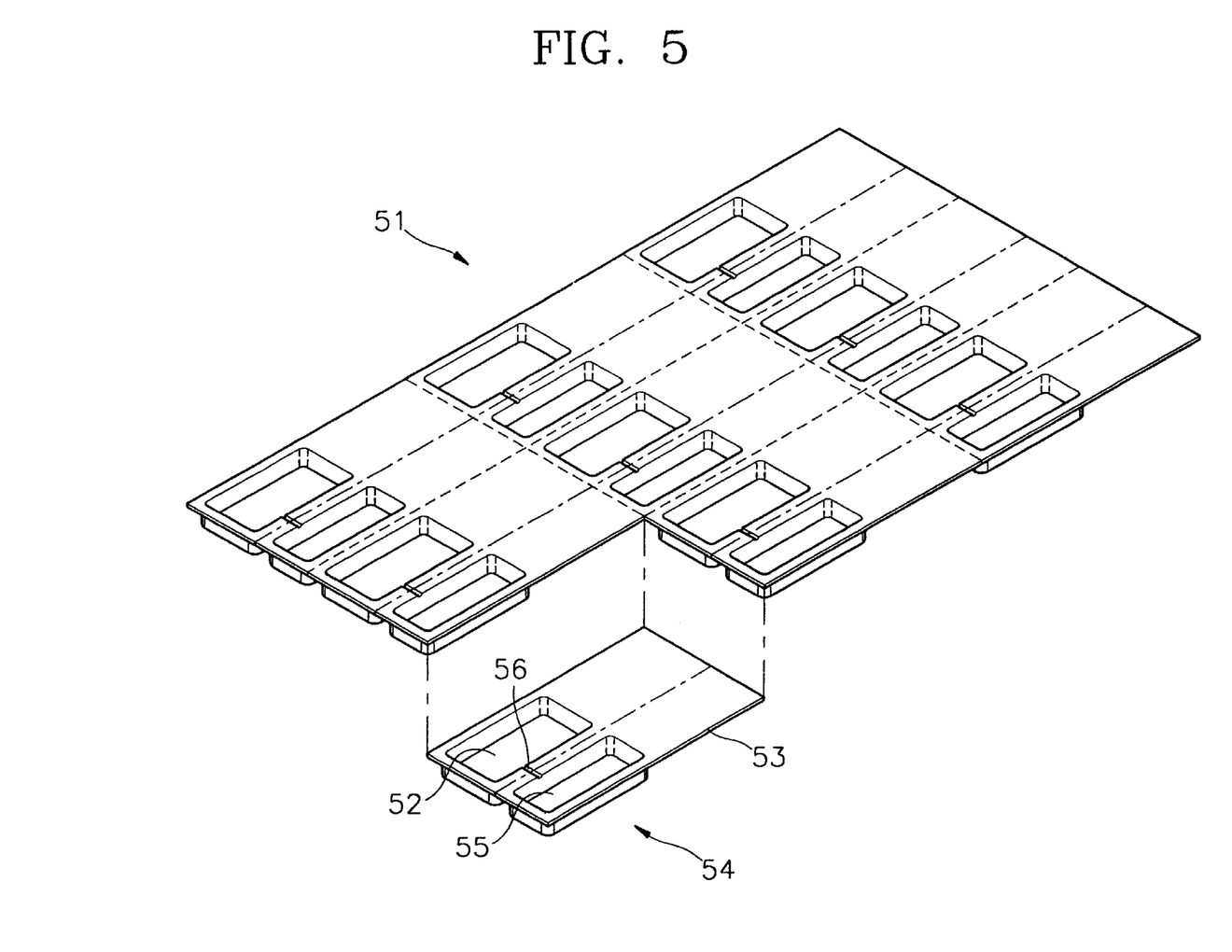
FIG. 5 is a perspective view for explaining a method for manufacturing the case of the secondary battery shown in FIG. 1.

FIG. 5 is a view for explaining a method for forming the secondary battery case shown in FIG. 1 in large quantities using a plate material.

Referring to the drawing, a plate material 51 is sectioned as indicated by the dotted lines and a unit case 54 can be formed per section. Each unit case 54 has a pan 52 and a gas receiving portion 55 of the battery main body. The gas generated in the battery pan 52 can be exhausted to the gas receiving portion 55 through a path 56. When a battery is manufactured including a battery main body in a battery case, the battery main body is contained in the battery pan 52. Next, a cover portion 53 covers over both the battery pan 52 and the gas receiving portion 55, forming a seal. At this time, the path 56 is kept in an open state. When the battery main body charges and discharges, the gas generated from the battery main body flows toward the gas receiving portion 55 through the path 56 from the battery pan 52. When the gas is gathered in the gas receiving portion 55, the path 56 is closed. Finally, the gas receiving portion 55 is removed in a severing process.

The unit case 54, as shown in FIG. 5, can be formed by severing the material along the line indicated by a dot-dash-dot line after the battery main body pan 55, the gas receiving portion 55, and the path 56 are formed per section through a predetermined process such as in a press.

In another embodiment, a separately manufactured battery main body is inserted in the pan 52 before the material 51 is severed along a dashed line extending in a lengthwise direction of the material 51 and along a dashed line extending in a widthwise direction thereof. Next, the cover portion 53 is folded concurrently so that the cover portion 53 is closely coupled to the pan 52. Next, the battery main body is charged/discharged and the path 56 is closed. Finally, the material 51 is severed in a lengthwise direction so that the gas receiving portion 52 is removed and simultaneously each unit case can be separated.

In yet another example, separately from the severance of the portions indicated by the dotted lines, the portion where the pan 52 is formed and the portion where the cover portion 53 is formed are severed and separated from each other and thus the battery case shown in FIG. 3 can be manufactured.

Figure 6:
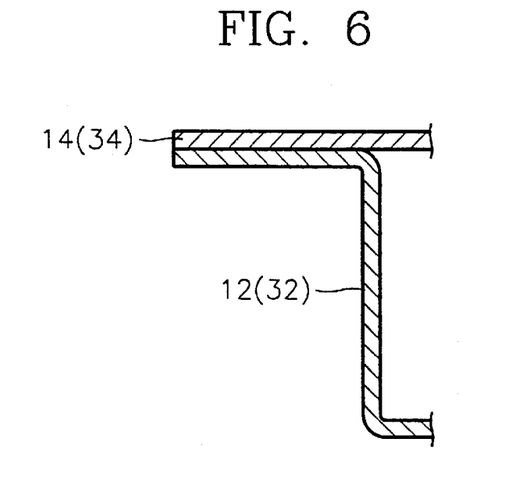
FIGS. 6 and 8 are sectional views taken along the lines VI—VI and VIII—VIII of FIG. 4
Figure 7:
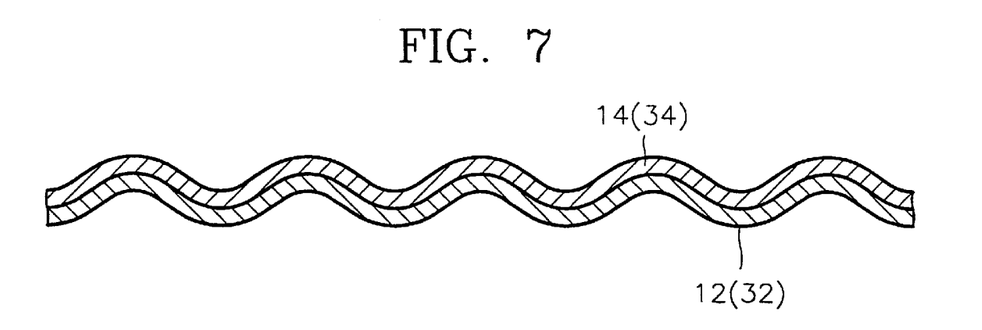
FIG. 7 is a sectional view taken along the line VII—VII of FIG. 2, respectively.
Figure 8:
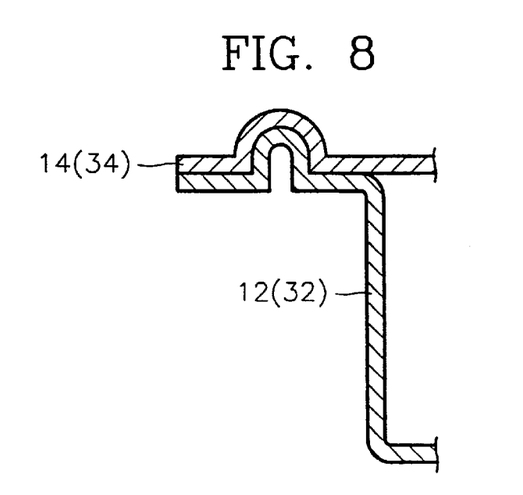

FIGS. 6 and 8 are sectional views taken along the lines VI—VI and VII—VII of FIG. 4 and FIG. 7 is a sectional view taken along the line VII—VII of FIG. 2. These drawings show methods of attaching the first bonding portion 12 (32) to the second bonding portion 14 (34).

FIG. 6 shows a surface bonding method, in which the first bonding portion 12 (32) and the second bonding portion 14 (34) are attached to each other without deformation.

Although various attaching methods can be used, arc welding is preferred.

FIG. 7 shows an embossing method, in which an embossed portion is formed at the corresponding portions of the first bonding portion 12 (32) and the second bonding portion 14 (34) to increase the bonding strength.

FIG. 8 shows a linear method, in which concave and convex portions are formed at the corresponding portions of the first bonding portion 12 (32) and the second bonding portion 14 (34). This method also increases the bonding strength.

As described above, in secondary batteries according to the present invention, the case having a pan for accommodating a battery main body, a cover portion for closing the pan, and a bonding portion extended along the edge of the pan and the cover portion can be easily manufactured. Also, since the bonding portions can be attached by one of a surface method, an embossing method, and a linear method, mass production of the case is possible and the bonding portions are connected together firmly.

What is claimed is:

1. A secondary battery and a case comprising:
   a secondary battery having a main body and first and second projecting electrode terminals; and
   a case including:
      a pan having a space accommodating the main body of the secondary battery;
      a first bonding flange extending along an edge of the pan;
      a cover extending from one side of the pan, closing the opening of the pan, and folded into the pan; and
      a second bonding flange extending along an edge of the cover and correspondingly bonded to the first bonding flange with the electrode terminals passing between the first and second bonding flanges and exposed outside the case.

2. The secondary battery and case as claimed in claim 1, wherein the pan, the first bonding flange, the cover, and the second bonding flange are a single piece of material.

3. The secondary battery and case as claimed in claim 1, wherein the first bonding flange and the second bonding flange are bonded to each other without their deformation.

4. The secondary battery and case as claimed in claim 1, including embossed portions in the first bonding flange and the second bonding flange in mutual engagement.

5. The secondary battery and case as claimed in claim 1, including concave and convex portions in the first bonding flange and the second bonding flange in mutual engagement.

6. A secondary battery and a case comprising:
   a secondary battery having a main body and first and second projecting electrode terminals; and
   a case including:
      a pan having a space accommodating the main body of the secondary battery;
      a first bonding flange extending along an edge of the pan;
      a cover not hingedly connected to the pan and closing the opening of the pan; and
      a second bonding flange extending along an edge of the cover and correspondingly bonded to the first bonding flange with the electrode terminals passing between the first and second bonding flanges and exposed outside the case.

7. The secondary battery and case as claimed in claim 6, wherein the first bonding flange and the second bonding flange are bonded to each other without their deformation.

8. The secondary battery and case as claimed in claim 6, including embossed portions in the first bonding flange and the second bonding flange in mutual engagement.

9. The secondary battery and case as claimed in claim 6, including concave and convex portions in the first bonding flange and the second bonding flange in mutual engagement.

* * * * *

UNITED STATES PATENT AND TRADEMARK OFFICE
CERTIFICATE OF CORRECTION

PATENT NO. : 6,242,130 C1
APPLICATION NO. : 90/006944
DATED : September 18, 2007
INVENTOR(S) : Hyung-gon Noh et al.

It is certified that error appears in the above-identified patent and that said Letters Patent is hereby corrected as shown below:

Title Page, Item (73) Assignee, change "Samsung Display Devices Co., Ltd., Suwon, Kyungki-do (KR)" to --Samsung SDI Co., Ltd., Suwon-si (KR)--.

Title Page, insert --(74) Attorney, Agent or Firm - Stein, McEwen & Bui, LLP--.

Signed and Sealed this

Fourth Day of December, 2007

JON W. DUDAS
*Director of the United States Patent and Trademark Office*

(12) EX PARTE REEXAMINATION CERTIFICATE (5892nd)
United States Patent
Noh et al.

(10) Number: US 6,242,130 C1
(45) Certificate Issued: Sep. 18, 2007

(54) CASE CONTAINING SECONDARY BATTERY

(75) Inventors: Hyung-gon Noh, Seoul (KR);
Jong-hoon Yun, Pusan (KR)

(73) Assignee: Samsung Display Devices Co., Ltd., Suwon, Kyungki-do (KR)

Reexamination Request:
No. 90/006,944, Feb. 19, 2004

Reexamination Certificate for:
Patent No.: 6,242,130
Issued: Jun. 5, 2001
Appl. No.: 09/328,795
Filed: Jun. 9, 1999

(30) Foreign Application Priority Data

Jul. 29, 1998 (KR) .......................................... 98-30677

(51) Int. Cl.
*H01M 10/36* (2006.01)
*H01M 2/02* (2006.01)
*H01M 10/40* (2006.01)

(52) U.S. Cl. ....................... 429/175; 429/176; 429/178
(58) Field of Classification Search .................. 429/133, 429/162, 163, 171, 178, 185
See application file for complete search history.

(56) References Cited

U.S. PATENT DOCUMENTS

| | | |
|---|---|---|
| 347,258 A | 8/1886 | Starr |
| 410,054 A | 8/1889 | Waldron |
| 2,100,333 A | 11/1937 | Hess |
| 3,146,132 A | 8/1964 | Nathan |
| 3,772,139 A | 11/1973 | George |
| 4,278,744 A * | 7/1981 | Athearn ........................ 429/181 |
| 4,525,439 A * | 6/1985 | Simonton ..................... 429/162 |
| 4,623,598 A * | 11/1986 | Waki et al. .................. 429/162 |
| 5,510,207 A | 4/1996 | Grivel et al. |
| 6,251,537 B1 * | 6/2001 | Kim et al. ................... 429/181 |

FOREIGN PATENT DOCUMENTS

| | | |
|---|---|---|
| EP | 0 973 211 | 1/2000 |
| JP | 59-154746 | 3/1984 |
| JP | 59-154747 | 3/1984 |
| JP | 59-19346 | 5/1984 |
| JP | 60-100362 | 6/1985 |
| JP | 09063639 A * | 3/1997 |
| JP | 09-265973 | 10/1997 |
| JP | 11045688 A * | 2/1999 |
| JP | 11144691 A * | 5/1999 |

OTHER PUBLICATIONS

Translation of JP 09063639 A.*
Translation of JP 11045688 A.*
Translation of JP 11144691 A.*

* cited by examiner

*Primary Examiner*—Kiley Stoner (57) ABSTRACT

A case for a secondary battery includes a pan having a space for accommodating a battery main body and an opening. A first bonding portion extends along the edge of the pan. A second bonding portion extends along the edge of the cover portion for corresponding attachment to the first bonding portion when folded onto the pan. Thus, mass production of the case is possible and the bonding portion becomes firm when the first and second bonding portions are bonded together.

FIG. 6
(AMENDED)

FIG. 7

FIG. 8
(AMENDED)

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

THE DRAWING FIGURES HAVE BEEN
CHANGED AS FOLLOWS:

In FIGS. 6 and 8 "12(32)" has been changed to —11(31)—.

The reference number "12(32)" has also been moved to the proper location in FIGS. 6 and 8.

AS A RESULT OF REEXAMINATION, IT HAS BEEN
DETERMINED THAT:

The patentability of claims 1–5 is confirmed.

Claim 9 is cancelled.

Claims 6 and 8 are determined to be patentable as amended.

Claim 7, dependent of an amended claim, is determined to be patentable.

New claims 10–73 are added and determined to be patentable.

6. A secondary battery and a case comprising:
a secondary battery having a main body and first and second projecting electrode terminals; and
a case including:
a pan having a space accommodating the main body of the secondary battery *having a closed path*;
a first bonding flange extending along an edge of the pan;
a cover not hingedly connected to the pan and closing the opening of the pan; and
a second bonding flange extending along an edge of the cover and correspondingly bonded to the first bonding flange with the electrode terminals passing between the first and second bonding flanges and exposed outside the case,
*wherein the closed path in the pan is formed by a process in which:*
*gas formed in the pan during charging and/or discharging of the secondary battery flows into a gas receiving portion through the path from the pan prior to the path being closed,*
*the path is closed such that the gas formed in the pan during charging and/or discharging of the secondary battery and which flowed into the gas receiving portion through the path from the pan while open cannot pass back into the pan, and*
*the gas receiving portion is removed to not be connected to the pan.*

8. [The secondary battery and case as claimed in claim 6.]
*A secondary battery and a case comprising:*
*a secondary battery having a main body and first and second projecting electrode terminals; and*
*a case including:*
*a pan having a space accommodating the main body of the secondary battery;*
*a first bonding flange extending along an edge of the pan;*
*a cover not hingedly connected to the pan and closing the opening of the pan;*
*a second bonding flange extending along an edge of the cover and correspondingly bonded to the first bonding flange with the electrode terminals passing between the first and second bonding flanges and exposed outside the case, and*
including embossed portions in the first bonding flange and the second bonding flange *comprising concave and convex portions on the first bonding flange and corresponding convex and concave portions on the second bonding flange* aligned in mutual engagement[.] *with the concave and convex portions of the first bonding flange.*

*10. The secondary battery and case as claimed in claim 1, wherein the case comprises a plate molded to form the pan and the first bonding flange.*

*11. The secondary battery and case as claimed in claim 10, wherein the plate is molded to form the pan with the space and the first bonding flange prior to accommodating the main body of the secondary battery.*

*12. The secondary battery and case as claimed in claim 11, wherein the plate comprises a sheet of metal molded to form the pan and the first bonding flange prior to accommodating the main body.*

*13. The secondary battery and case as claimed in claim 12, wherein a shape of the pan is the same before and after accommodating the main body.*

*14. The secondary battery and case as claimed in claim 1, wherein a shape of the pan is the same before and after accommodating the main body.*

*15. The secondary battery and case as claimed in claim 14, wherein the shape of the pan defines the space as a cubic space with an opening into which the main body is introduced to the pan so as to be accommodated therein.*

*16. The secondary battery and case as claimed in claim 14, wherein the pan includes an opening into which the main body is introduced to the pan so as to be accommodated in the space therein.*

*17. The secondary battery and case as claimed in claim 16, wherein the cover comprises a plate having a same shape as the opening so as to cover the opening.*

*18. The secondary battery and case as claimed in claim 17, wherein the shape of the pan is formed to be the same as a shape of the main body prior to receiving the main body.*

*19. The secondary battery and case as claimed in claim 16, wherein the cover comprises a plate substantially parallel to a plane defined by the opening and a bonding surface of the combined first and second bonding flanges.*

*20. The secondary battery and case as claimed in claim 1, wherein the space of the pan extends from the cover to accommodate all of the main body at or below the first bonding flange.*

*21. The secondary battery and case as claimed in claim 20, wherein the space of the pan has an opening into which the main body is accommodated, and the opening is disposed at or between the main body and the cover.*

*22. The secondary battery and case as claimed in claim 21, wherein the cover comprises an extension of the first bonding flange and which extends as a plate parallel to the* first bonding flange prior to being folded across the opening so as to cover the opening.

23. The secondary battery and case as claimed in claim 6, wherein the case comprises a plate molded to form the pan and the first bonding flange.

24. The secondary battery and case as claimed in claim 23, wherein the plate is molded to form the pan and the first bonding flange prior to accommodating the main body.

25. The secondary battery and case as claimed in claim 24, wherein the plate comprises a sheet of metal molded to form the pan and the first bonding flange prior to accommodating the main body.

26. The secondary battery and case as claimed in claim 25, wherein a shape of the pan is the same before and after accommodating the main body.

27. The secondary battery and case as claimed in claim 6, wherein a shape of the pan is the same before and after accommodating the main body.

28. The secondary battery and case as claimed in claim 27, wherein the shape of the pan defines the space as a cubic space with an opening into which the main body is introduced to the pan so as to be accommodated therein.

29. The secondary battery and case as claimed in claim 27, wherein the pan includes an opening into which the main body is introduced to the pan so as to be accommodated in the space therein.

30. The secondary battery and case as claimed in claim 29, wherein the cover comprises a plate having a same shape as the opening so as to cover the opening.

31. The secondary battery and case as claimed in claim 30, wherein the shape of the pan is formed to be the same as a shape of the main body prior to receiving the main body.

32. The secondary battery and case as claimed in claim 29, wherein the cover comprises a plate substantially parallel to a plane defined by the opening and a bonding surface of the combined first and second bonding flanges.

33. The secondary battery and case as claimed in claim 6, wherein the pan defines a space which accommodates all of the main body at or below the first bonding flange.

34. The secondary battery and case as claimed in claim 33, wherein the space of the pan has an opening into which the main body is accommodated, and the opening is disposed at or between the main body and the cover.

35. The secondary battery and case as claimed in claim 4, wherein the cover comprises an extension of the first bonding flange formed by folding the extension across the opening so as to cover the opening.

36. The secondary battery and case as claimed in claim 10, wherein the plate is molded to form the pan by a pressing process.

37. The secondary battery and case as claimed in claim 11, wherein the plate is molded to form the pan and the first bonding flange by a pressing process.

38. The secondary battery and case as claimed in claim 12, wherein the plate is molded to form the pan and the first bonding flange by a pressing process.

39. The secondary battery and case as claimed in claim 1, wherein a shape of the pan defines the space as a cubic space with an opening into which the main body is introduced to the pan so as to be accommodated therein.

40. The secondary battery and case as claimed in claim 1, wherein the pan includes an opening into which the main body is introduced to the pan so as to be accommodated in the space therein.

41. The secondary battery and case as claimed in claim 1, wherein the cover comprises a plate substantially parallel to a plane defined by the opening and a bonding surface of the combined first and second bonding flanges.

42. The secondary battery and case as claimed in claim 10, wherein the cover comprises a plate substantially parallel to a plane defined by the opening and a bonding surface of the combined first and second bonding flanges.

43. The secondary battery and case as claimed in claim 11, wherein the cover comprises a plate substantially parallel to a plane defined by the opening and a bonding surface of the combined first and second bonding flanges.

44. The secondary battery and case as claimed in claim 12, wherein the cover comprises a plate substantially parallel to a plane defined by the opening and a bonding surface of the combined first and second bonding flanges.

45. The secondary battery and case as claimed in claim 13, wherein the cover comprises a plate substantially parallel to a plane defined by the opening and a bonding surface of the combined first and second bonding flanges.

46. The secondary battery and case as claimed in claim 14, wherein the cover comprises a plate substantially parallel to a plane defined by the opening and a bonding surface of the combined first and second bonding flanges.

47. The secondary battery and case as claimed in claim 15, wherein the cover comprises a plate substantially parallel to a plane defined by the opening and a bonding surface of the combined first and second bonding flanges.

48. The secondary battery and case as claimed in claim 1, wherein the cover comprises an extension of the first bonding flange and which extends as a plate parallel to the first bonding flange prior to being folded across the opening so as to cover the opening.

49. The secondary battery and case as claimed in claim 10, wherein the cover comprises an extension of the first bonding flange and which extends as a plate parallel to the first bonding flange prior to being folded across the opening so as to cover the opening.

50. The secondary battery and case as claimed in claim 11, wherein the cover comprises an extension of the first bonding flange and which extends as a plate parallel to the first bonding flange prior to being folded across the opening so as to cover the opening.

51. The secondary battery and case as claimed in claim 12, wherein the cover comprises an extension of the first bonding flange and which extends as a plate parallel to the first bonding flange prior to being folded across the opening so as to cover the opening.

52. The secondary battery and case as claimed in claim 13, wherein the cover comprises an extension of the first bonding flange and which extends as a plate parallel to the first bonding flange prior to being folded across the opening so as to cover the opening.

53. The secondary battery and case as claimed in claim 14, wherein the cover comprises an extension of the first bonding flange and which extends as a plate parallel to the first bonding flange prior to being folded across the opening so as to cover the opening.

54. The secondary battery and case as claimed in claim 15, wherein the cover comprises an extension of the first bonding flange and which extends as a plate parallel to the first bonding flange prior to being folded across the opening so as to cover the opening.

55. The secondary battery and case as claimed in claim 16, wherein the cover comprises an extension of the first bonding flange and which extends as a plate parallel to the first bonding flange prior to being folded across the opening so as to cover the opening.

56. The secondary battery and case as claimed in claim 17, wherein the cover comprises an extension of the first bonding flange and which extends as a plate parallel to the

*first bonding flange prior to being folded across the opening so as to cover the opening.*

57. *The secondary battery and case as claimed in claim 18, wherein the cover comprises an extension of the first bonding flange and which extends as a plate parallel to the first bonding flange prior to being folded across the opening so as to cover the opening.*

58. *The secondary battery and case as claimed in claim 19, wherein the cover comprises an extension of the first bonding flange and which extends as a plate parallel to the first bonding flange prior to being folded across the opening so as to cover the opening.*

59. *The secondary battery and case as claimed in claim 1, further comprising a gas receiving portion connected to the pan through a path, wherein*

*the pan, the gas receiving portion, and the path are sealed to allow the secondary battery to charge and/or discharge, and*

*after sealing, gas formed in the pan during charging and/or discharging of the secondary battery flows into the gas receiving portion through the path from the pan.*

60. *The secondary battery and case as claimed in claim 59, wherein after charging and/or discharging is performed, the path is closed such that the gas formed in the pan during charging and/or discharging of the secondary battery and which flowed into the gas receiving portion through the path from the pan cannot pass back into the pan.*

61. *The secondary battery and case as claimed in claim 59, wherein the gas receiving portion and path are at least partially closed by the folded cover such that the folded cover covers and seals the pan, the path, and the gas receiving portion while allowing gas formed in the pan during charging and/or discharging of the secondary battery to flow into the gas receiving portion through the path from the pan.*

62. *The secondary battery and case as claimed in claim 10, wherein the plate is press-formed to form the pan.*

63. *The secondary battery and case as claimed in claim 11, wherein the plate is press-formed to form the pan and the first bonding flange.*

64. *The secondary battery and case as claimed in claim 12, wherein the plate is press-formed to form the pan and the first bonding flange.*

65. *The secondary battery and case as claimed in claim 1, further comprising a closed path in the pan formed by a process in which:*

*gas formed in the pan during charging and/or discharging of the secondary battery flows into a gas receiving portion through the path from the pan prior to the path being closed,*

*the path is closed such that the gas formed in the pan during charging and/or discharging of the secondary battery and which flowed into the gas receiving portion through the path from the pan while the path was open cannot pass back into the pan; and*

*the gas receiving portion is removed to not be connected to the pan.*

66. *The secondary battery and a case comprising:*

*a secondary battery having a main body and first and second projecting electrode terminals; and*

*a case including:*

*a pan having a space accommodating the main body of the secondary battery;*

*a first bonding flange extending along an edge of the pan;*

*a cover not hingedly connected to the pan and closing the opening of the pan;*

*a second bonding flange extending along an edge of the cover and correspondingly bonded to the first bonding flange with the electrode terminals passing between the first and second bonding flanges and exposed outside the case, and*

*including concave and convex portions in the first bonding flange and the second bonding flange in mutual engagement,*

*wherein the first bonding flange includes concave and convex portions and the second bonding flange includes corresponding convex and concave portions aligned in mutual engagement with the concave and convex portions of the first bonding flange.*

67. *The secondary battery and case as claimed in claim 5, wherein the concave and convex portions comprise concave and convex portions on the first bonding flange and corresponding convex and concave portions on the second bonding flange aligned in mutual engagement with the concave and convex portions on the first bonding flange.*

68. *The secondary battery and case as claimed in claim 5, wherein the first bonding flange is fomed by:*

*a plate material being press-formed to form the pan which has a shape that is the same before and after accommodating the main body and having the first bonding flange extending along an edge of the pan, and*

*further forming the formed first bonding flange to include the concave and convex portions.*

69. *The secondary battery and case as claimed in claim 4, wherein:*

*the embossed portions are on all edges of the pan except the one side from which the cover extends to increase a bonding strength at the edges other than the one side, and*

*the embossed portions include concave and convex portions on the first bonding flange and corresponding convex and concave portions on the second bonding flange aligned in mutual engagement with the concave and convex portions of the first bonding flange.*

70. *The secondary battery and case as claimed in claim 69, wherein the opening has a substantially rectangular shape and the first flange is on three of the four sides of the pan, and the embossed portions are on the three sides of the pan.*

71. *The secondary battery and case as claimed in claim 5, wherein the concave and convex portions are on all sides of the pan except the one side from which the cover extends to increase a bonding strength at the sides other than the one side.*

72. *The secondary battery and case as claimed in claim 71, wherein the opening has a substantially rectangular shape and the first flange is on three of the four sides of the pan, and the concave and convex portions are on the three sides of the pan.*

73. *The secondary battery and case as claimed in claim 67, wherein the concave and convex portions are on all sides of the pan except the one side from which the cover extends to increase a bonding strength at the sides other than the one side.*

\* \* \* \* \*